United States Patent [19]

Catania

[11] Patent Number: 4,678,740
[45] Date of Patent: Jul. 7, 1987

[54] METHOD FOR MAKING PHOTOGRAPHIC MATTES

[76] Inventor: James N. Catania, 7523 Hollywood Blvd., Apt. 212, Los Angeles, Calif. 90046

[21] Appl. No.: 728,330

[22] Filed: Apr. 29, 1985

[51] Int. Cl.[4] .......................... G03C 7/02; G03C 7/18; G03C 7/32; G03C 7/20
[52] U.S. Cl. ..................... 430/356; 430/359; 430/360; 430/361; 430/364; 430/390; 430/391; 430/394; 430/402; 430/952
[58] Field of Search .............. 430/356, 402, 357, 360, 430/364, 390–392, 394, 396, 397, 502, 361, 952

[56] References Cited

U.S. PATENT DOCUMENTS

| | | | |
|---|---|---|---|
| 827,241 | 7/1906 | Hyde | 430/360 |
| 2,336,380 | 12/1943 | Wilmanns | 430/360 |
| 3,158,477 | 11/1964 | Vlahos | 430/396 |
| 3,497,350 | 6/1965 | Yutzy et al. | 96/22 |
| 3,674,490 | 7/1972 | Matejec | 430/367 |
| 4,304,847 | 12/1981 | Nakamura et al. | 430/390 |

FOREIGN PATENT DOCUMENTS 50-118480 9/1975 Japan .

OTHER PUBLICATIONS

"Journal of the Society of Motion Picture and Television Engineers", vol. 74, No. 3, Mar. 1965, 'Traveling-Matte Photography and the Blue-Screen System' by Beyer, Walter.

Primary Examiner—Richard L. Schilling
Attorney, Agent, or Firm—Pretty, Schroeder, Brueggemann & Clark

[57] ABSTRACT

A photographic matte for use in traveling matte photography is formed by recording a separation of a first screen-color separation of an image on a first film layer and recording a separation of a different second color on a second layer. Preferably, the second color is complementary to the screen color. One layer is developed to form a positive image and the other to form a negative image, these images reinforcing each other. One image is formed by black dye, using a coupler and a color developer and the other is formed by a black dye destruct technique in which the developed portion of the silver halide emulsion is removed. According to another aspect of the invention, a matte of increased density can be formed without commensurate image growth by combining a black dye image with a silver image.

21 Claims, 4 Drawing Figures

METHOD FOR MAKING PHOTOGRAPHIC MATTES

SUMMARY OF THE INVENTION

A process for use in traveling matte photography that overcomes above-mentioned disadvantages of previously known techniques, in accordance with the present invention, comprises a method in which a screen-color separation is formed on a first layer of a film and a separation of a different color is formed on a second layer. One layer is developed to form positive image and the other is developed to form a negative image. Preferably the color of the second layer is complementary to the screen color. Thus the screen color can be blue and the second color yellow. Alternatively, there may be a third layer, in which case the first layer can record blue and the second and third layers can record red and green, respectively.

According to another aspect of the invention, one layer is subjected to color development using a dye coupler (preferably black) and the other layer is subjected to black dye-destruct development.

Preferably, the above-mentioned film is exposed through a color negative of the foreground action recorded before a screen of a color excluded from the scene. The result can be a hold-out matte, also useful in making a cover matte or intermatte.

According to still another aspect of the invention, a matte of increased density is produced without unacceptable image growth by exposing a single emulsion layer containing silver halide and a dye coupler and developing the film without removing the silver. A series of such layers that combine silver and a dye can be superimposed.

BACKGROUND OF THE INVENTION

Traveling matte photographic processes enable the foreground and background portions of a motion picture scene to be photographed separately and then combined to produce a single composite image. This process can have many practical advantages. It permits sharp focus of both foreground and background, permits separate control of the color balance for foreground and background, and facilitates many special effects that could not otherwise be produced. It can also contribute markedly to production efficiency since the two component parts of a scene can be photographed at different times and in different places.

The essence of traveling matte photography, from a technical point of view, is the production of a silhouette or "matte" of the foreground component of the scene. This matte is used to prevent exposure of the corresponding portion of a film while the background is recorded. The foreground is added later on the unexposed portion of the film, as explained in U.S. Pat. No. 3,158,477 to Vlahos.

To produce such a matte by conventional techniques, the foreground, which is usually an action scene, is staged first in front of a plain backing referred to herein as a screen. This type of system is commonly known as a "blue screen" system because blue is the color usually chosen for the screen. Blue is preferred because, as compared to the other primary colors, it has less intensity in flesh tones and can therefore be more completely eliminated from a typical foreground scene.

The foreground is photographed before the blue screen using a color negative film. The blue component of this negative is then separated by a series of steps, employing filters and high contrast film techniques, to ultimately produce a matte that is dense in the foreground areas and transparent in blue screen areas.

A number of variations of this "blue-screen" system are used but they all generally employ the same basic known principles. The fundamental problem with all such systems is the achievement of accuracy in the matte which must precisely fit the foreground portion of the scene. Accuracy is lost primarily due to the need to reprint the image at least three times, and sometimes more often, before the desired matte is ultimately produced. During this process the matte image tends to grow and the fine details of its outline are lost. A matte that is too large will result in a composite image that includes a black "matte line" surrounding the foreground. A matte that is too small, which is less common, will produce "fringing", i.e., the foreground is surrounded by a thin border of bright light.

Another problem associated with conventional blue screen systems is that the production of the matte, with many intermediate steps, tends to be a time consuming and labor intensive process and is therefore costly.

An objective of the present invention is the production of a matte by a simplified process that eliminates many intermediate steps, producing a high quality and more accurate matte at a lower cost. Other features and advantages of the present invention will become apparent from the following detailed description, taken in conjunction with the accompanying drawings, which illustrate, by way of example, the principles of the invention.

DESCRIPTION OF THE PREFERRED EMBODIMENTS

In practicing the method of the present invention, the foreground or action portion of a composite traveling matte sequence is photographed first before a screen in the conventional manner, the screen color being excluded from the foreground action to the extent possible. In general, blue is the preferred screen color. Then a color negative transparency of the image thus recorded is produced. This transparency, or a copy of it, will be used in the conventional manner to produce the composite foreground and background image that is the ultimate result of the traveling matte process. The same transparency is used to produce the necessary matte to be used in the conventional manner in the production of the composite image.

Figure 1:
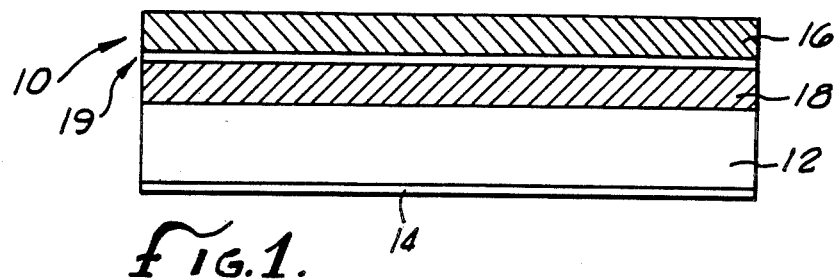
FIG. 1 is a cross-sectional schematic illustration of a first film useful in producing a traveling matte in accordance with the present invention.

A first exemplary photographic film 10 (shown in FIG. 1) for use with the current invention includes a support base 12, which may be Mylar or tri-acetate, having a conventional anti-halation layer 14 on its bottom surface. Covering the top surface of the base 12 are a first emulsion layer 16, forming the top layer of the film 10, and a second emulsion layer 18 sandwiched between the first layer and the base. Both emulsion layers 16 and 18 contain fine grain silver halide. A yellow filter 19 is disposed between the first and second layers 16 and 18 to block blue light that would otherwise reach the second emulsion layer 18.

The first layer 16 is sensitive to the screen color, in this case blue. Thus the intensity of the image developed from this layer 16 is proportional to the quantity of blue light to which it is exposed. Through the use of a black dye coupler and a color developer, this layer can be developed to form a monochrome recording of the blue light portion of an image to which it is exposed. If exposed to a negative image, it will therefore produce a blue separation positive (or blue print) made up of black and white with appropriate shades of gray formed by the black dye.

The second emulsion layer 18 is sensitive to a color different from the screen color and preferably complementary to the screen color. In this example, since the screen color is blue, the second emulsion layer 18 could be sensitized to red or green, but yellow is preferred. The second layer 18 is a black dye destruct layer, in which the developed portion of the silver halide emulsion is removed. This is a well known black and white development process in which the developer reacts with silver. Bleach is then used to remove the black dye in proportion to the silver developed and to covert the metallic silver to silver halide (salts) so that it can be removed in a fixer solution. Finally, a stabilizer is used. Thus when exposed to light having a yellow component that has passed through a color negative and then developed, the second layer 18 produces a yellow separation negative formed by black dye.

The use of this unique matte-producing film 10 can now be considered. First, the foreground action is photographed in the conventional manner against a blue screen backing and a color negative is produced. The film 10 is then exposed to light passing through the color negative. This may be white light or it may be magenta (blue and red) or cyan (blue and green). The areas of the color negative corresponding to the blue screen (which will be yellow/orange) will not pass blue light and the first (blue sensitive) layer 16 will be unexposed in these areas. Yellow light, to which the second layer 18 is sensitive, will pass through the blue screen areas of the negative and will expose the corresponding portions of the second layer 18 which is yellow sensitive. Thus the effect of both the first and second layers 16 and 18 is to produce a transparent area wherever the blue screen is present. Next, consider a portion of the foreground that contains red or green. The corresponding portion of the color negative will transmit the red/green component in proportion to the red/green content of the subject. Red and green produce a high density in the blue sensitive layer 16 and will also produce density in the second layer 18. Only the blue-screen area will be transparent.

Finally, consider a portion of the foreground area that contains some blue, but of considerably less intensity than the blue screen. This might be a part of the foreground that is predominantly of another color or combination of colors, but unavoidably contains some residual blue. A gray area is a good example. The corresponding area of the color negative will transmit attenuated blue light, producing a gray first layer 16. It will also transmit some yellow, producing gray in the second layer 18. Since the grays of these two areas 16 and 18 will overlie and reinforce each other, the partially blue-content areas will behave like non-blue areas, producing density in the film 10 of the invention. The result, upon the development of the film 10 is an image with no gray tones. It is transparent in the area of intense blue from the blue screen and it is of high density in all other areas. It can be used as a traveling matte or it can be used to generate a cover matte or an intermatte.

Figure 2:
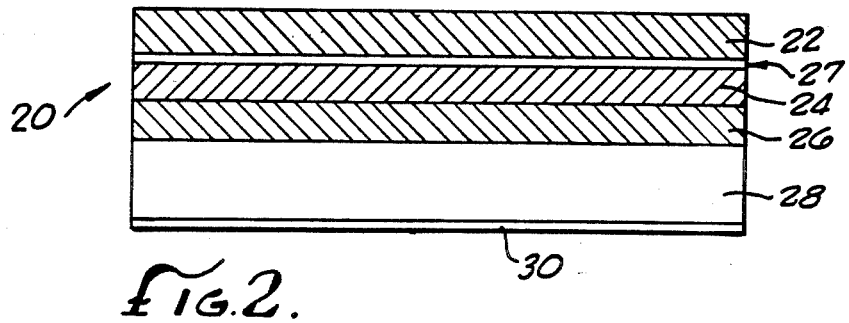
FIG. 2 is a cross-sectional schematic illustration of a second film useful in producing a traveling matte, this film being similar to the film of FIG. 1, but containing an additional layer and therefore being selectively responsive to more colors.

A second embodiment of the invention, shown in FIG. 2, is a film 20 that includes three emulsion layers 22, 24 and 26 sensitive to different colors of light, all these layers being supported by a single Mylar or tri-acetate base layer 28 which carries an anti-halation layer 30 on its reverse side. A yellow filter 27 between the first and second layers 22 and 24 prevents blue light from reaching the second and third layers 24 and 26.

The top layer 22 is sensitive to the screen color, preferably blue, and it is subject to color development in the presence of a black dye coupler. When exposed to light passing through a color negative, it records a blue separation positive in black and white. The second and third emulsion layers 24 and 26 are sensitive to green and red respectively. These are black dye destruct layers. The film 20 of the second embodiment differs from the film 10 of the first embodiment in that the non-blue light passing through the color negative is represented by two colors, red and green, instead of one, yellow. This insures more complete transparency in the foreground area and greater uniformly high density in the other areas.

Both of the films 10 and 20 described above can be used to reexpose a foreground color interpositive film (not shown). After the interpositive film has been exposed to the foreground, it can be rewound and exposed a second time with the same film 10 or 20. The second exposure will result in the darkening of the blue screen area to neutral or black. Therefore, the exposure is color balanced to favor attenuating the blue-screen area to a dark neutral or black.

Figure 3:
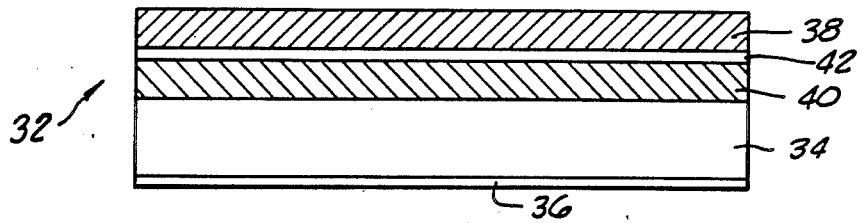
FIG. 3 is a cross-sectional schematic illustration of a third film useful in producing a color difference matte, this film being similar to the film of FIG. 1 but producing an image that is the reverse of that produced by the film of FIG. 1.

A third embodiment of the invention, shown in FIG. 3, is a film 32 similar to the film 10 of the first embodiment but constructed to produce a reverse image, the blue screen area being of high density. It is useful for producing an improved color difference matte.

This film 32 has a Mylar or tri-acetate base 34 that carries an anti-halation backing 36 and first and second emulsion layers 38 and 40. A yellow filter 42 positioned beneath the first layer 38 prevents blue light from reaching the second layer 40. As in the first film 10, the top layer 38 is blue sensitive. Unlike the first film 10, however, it is this screen-color-sensitive layer that is a black dye destruct layer. After exposure to white light through a color negative, which does not transmit blue in the areas of the blue screen, the first layer 38 does not react, thus producing high density in the blue screen area. The second layer 40 is sensitive to a different color, preferably a color complementary to the screen, in this case yellow. The second (yellow sensitive) layer 40 is developed first using a black dye coupler. A yellow dye coupler can be substituted. The top layer 38 is then developed by a black and white developer which reacts with the silver and is then bleached so that it can be removed by a fixer solution, leaving the black dye.

After interpositive stock has been exposed to red and green light passing through the blue-screen foreground negative and to blue light from a panchromatic, yellow, red or green separation negative, it is exposed to blue light passing through the color difference matte film 32. Processing of interpositive stock produces a color interpositive with a darkened blue screen area. Using a yellow (sodium vapor) monochromatic light source to expose for a yellow separation negative and the yellow sensitive layer 40 will improve the color difference matte so that it will reproduce colors such as yellow, green, cyan, and magenta in the foreground scene.

The above method constitutes a technique for darkening the blue-screen area via the color difference system. It is an alternative to exposing the blue-screen areas of a conventional interpositive, using the films 10 and 20 of FIGS. 1 and 2.

Figure 4:
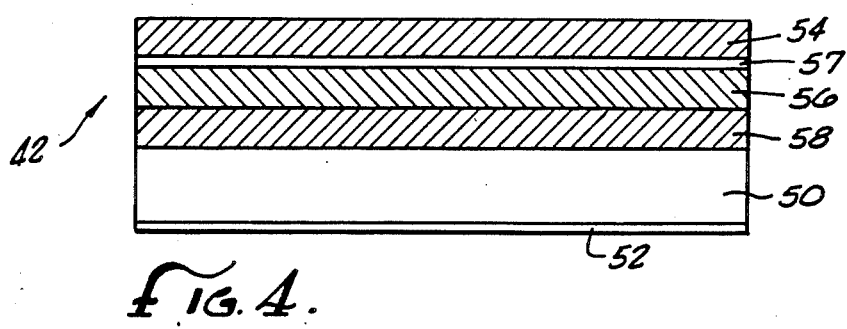
FIG. 4 is a cross-sectional illustration of a fourth film that combines silver and dye to produce a high density image.

Another aspect of the invention, shown in FIG. 4, is a film 42 that includes a support base 50, which may be Mylar or tri-acetate, having an anti-halation layer 52 on its bottom surface. Covering the base 50 is a first emulsion layer 54 that is blue sensitive, a second emulsion layer 56 that is green sensitive, and finally a third emulsion layer 58 that is red sensitive. A yellow filter 57 is positioned between layers 54 and 56. Each emulsion layer 54, 56 and 58 contains fine grain silver halide and a black dye coupler. Using both a black dye coupler and a color developer, these layers are each caused to record a portion of the hold-out matte or an intermatte that is formed by a combination of silver and dye. The silver is not removed during processing.

If, for example, the densitometer reading of the silver is 0.35 and the reading of the black dye is also 0.35, a single layer has a reading of 0.70. The three layers 54, 56 and 58 together produce a total density of 2.10. However, the matte growth corresponds to a density of only 0.35. The result is a matte having six times the potential density of a conventional matte, without loss of quality.

It should be understood that a half density matte may be made by exposing only one layer. Exposing with more light, such as blue, a density of, for example, 1.40 could readily be achieved (silver density 0.70, black dye density 0.70).

Each of the above films 10, 20, 32 and 42 is described in terms of a single frame. It should be appreciated, however, that the present invention, while potentially useful in the field of still photography, is most advantageous in the production of motion pictures. Each successive frame is exposed according to the same technique.

It will be apparent that a hold-out matte, cover matte, intermatte, or a color difference matte is easily and economically produced by this invention. It requires a minimum of reproduction steps, thus minimizing any growth or distortion of the matte image. Registration related errors are largely eliminated.

While particular forms of the invention have been illustrated and described, it will be apparent that various modifications can be made without departing from the spirit and scope of the invention.

I claim:

1. For use in traveling matte photography, a process for making a photographic matte corresponding to an image of a foreground and a screen of a predetermined screen color, comprising:

recording a screen color separation of said image on a first layer of a photographic film;

recording a separation of a second and different color on a second layer of said film that is coextensive with said first layer; and developing one of said layers to form a positive image and developing the other of said layers to form a negative image, whereby said images overlie and reinforce each other.

2. The process of claim 1 wherein said second color is complementary to said screen color.

3. The process of claim 1 wherein said screen color is blue and said second color is yellow.

4. The process of claim 1 wherein one of said layers is subjected to color development using a dye coupler and the other of said layers is subjected to black dye-destruct development.

5. The process of claim 4 wherein said dye coupler is a black dye coupler.

6. The process of claim 4 wherein:
    said screen color is blue; and
    said first layer is positioned above said second layer.

7. The process of claim 6 wherein said second color is yellow.

8. The process of claim 1 wherein:
    said first layer is subjected to color development; and
    said second layer is subjected to black dye-destruct development.

9. The process of claim 1 wherein;
    said first layer is subjected to black dye-destruct development; and
    said second layer is subjected to color development.

10. For use in traveling matte photography, a process for making a photographic matte corresponding to an image of a foreground and a screen of a predetermined screen color, comprising:

a first step of recording a screen color separation of said image on a first layer of a photographic film;

a second step of recording separations of second and third colors on second and third layers of said film, respectively; and developing said layer or layers of one of said steps to form a positive image and developing the other said layer or layers to form a negative image.

11. The process of claim 10 wherein said screen color is blue and said second and third colors are green and red.

12. The process of claim 10 wherein the layer or layers of one of said steps is subjected to color development using a dye coupler and the other of said layers is subjected to black dye-destruct development.

13. The process of claim 10 wherein:
    said screen color is blue; and
    said first layer is positioned above said second and third layers.

14. A traveling matte photographic process comprising:

photographing a foreground against a screen of a color excluded from said foreground;

producing a color transparency of the image thus photographed;

passing light through said transparency onto a matte-producing film and thus recording a screen color separation of said image on a first layer of said film and recording a separation of a second and different color on said second layer of said film; and developing one of said layers to form a positive image and developing the other of said layers to form a negative image.

15. The process of claim 14 wherein said second color is complementary to said screen color.

16. The process of claim 14 wherein said screen color is blue and said second color is yellow.

17. The process of claim 14 wherein one of said layers is subjected to color development using a dye coupler and the other of said layers is subjected to black dye-destruct development.

18. The process of claim 14 wherein:
said screen color is blue;
said first layer is positioned above said second layer;
said first layer is subjected to color development; and
said second layer is subjected to black dye-destruct development.

19. The method of claim 18 wherein said transparency is a negative and said matte is dense in the areas of said foreground.

20. The process of claim 14 wherein:
said first layer is subjected to color development; and
said second layer is subjected to black dye-destruct development.

21. The method of claim 14 wherein said film includes a third layer on which a third color separation is recorded, said third layer being developed by the same technique as said second layer.

* * * * *